Figure 1:
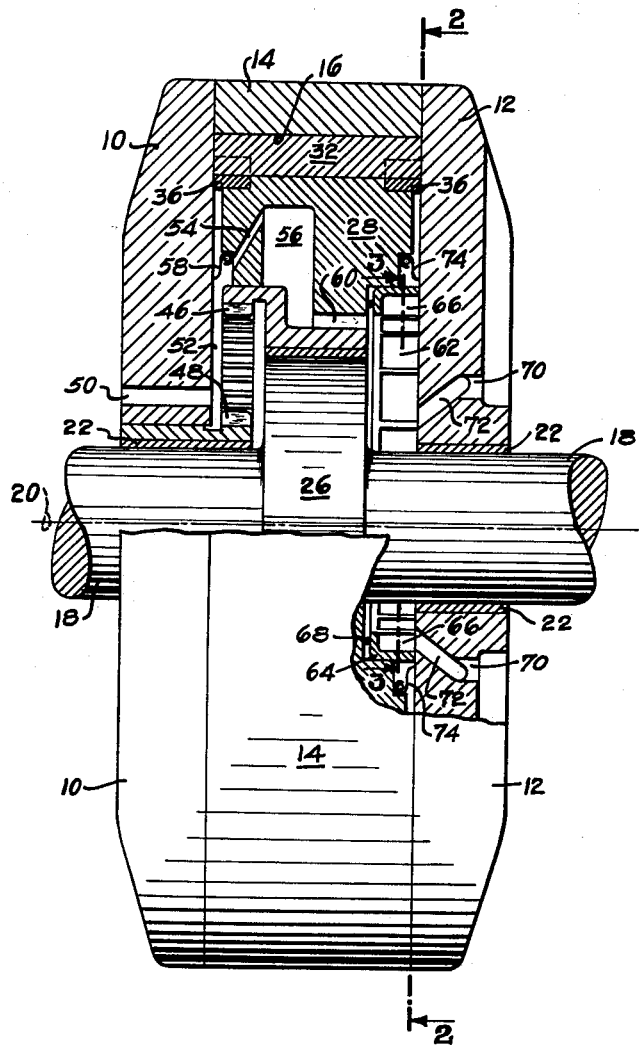

Feb. 2, 1965     HANNS-DIETER PASCHKE     3,168,237
ROTOR COOLING ARRANGEMENT FOR ROTARY MECHANISMS
Filed July 30, 1962                          3 Sheets-Sheet 1

INVENTOR.
HANNS-DIETER PASCHKE
BY
Thomas W. Kennedy
ATTORNEY

INVENTOR.
HANNS-DIETER PASCHKE
BY
Thomas W. Kennedy
ATTORNEY

United States Patent Office 3,168,237
Patented Feb. 2, 1965

3,168,237
ROTOR COOLING ARRANGEMENT FOR
ROTARY MECHANISMS
Hanns-Dieter Paschke, Neckarsulm, Wurttemberg, Germany, assignor to NSU Motorenwerke Aktiengesellschaft, Neckarsulm, Germany, and Wankel G.m.b.H., Lindau (Bodensee), Germany
Filed July 30, 1962, Ser. No. 213,495
Claims priority, application Germany, Sept. 9, 1961, N 20,533
6 Claims. (Cl. 230—210)

The present invention relates broadly to the art of rotary mechanisms and is particularly directed to rotor cooling means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multilobed profile which preferably is basically an epitrochoid. The inner body or rotor has end faces disposed adjacent to said outer body end walls for sealing co-operation therewith and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. The inner body rotates while the outer body or housing is stationary. A cooling fluid preferably oil, flows through a hollow portion of the rotor for the purpose of cooling the rotor.

The primary object of the invention resides in the provision of a novel cooling system for the engine rotor which minimizes the volume of cooling liquid required. For this purpose it has already been proposed to provide a stationary hollow disk within the rotor, said disk having scoop or outflow passages through which the centrifugal forces on the fluid coolant force the fluid when the fluid within the rotor reaches a level to cover the radally outer ends of said passages. Such a prior construction is shown in co-pending application Serial No. 21,989, filed April 13, 1960, now Patent No. 3,091,386, issued May 28, 1963.

However, a stationary disk is difficult to install in the usual rotary engine. This is particularly true in a power plant consisting of a series of such engines having a one-piece shaft with a plurality of eccentric portions.

An object of the present invention comprises the provision of a rotary combustion engine having an improved rotor cooling system.

Specifically, this invention provides a rotary, axially-movable open annular channel member or ring carried by the rotor at an end face of said rotor and elastically bearing against the housing end wall. This annular channel member rotates with the rotor about the engine axis and preferably is disposed in a recessed portion of the rotor end face and has pocket-like recesses or cups on the inner surface of the annular channel, said recesses facing radially inwardly for collecting the coolant emptying from outflow conduits in the rotor end face and also facing axially outwardly for conveying the coolant to outlet passage means in the adjacent housing end wall.

This annular channel member is effective in minimizing the volume of fluid coolant necessary for cooling the rotor, and is suited to assembly in single and multiple engine arrangements. It also has a supplementary function as a fluid seal between the rotor and adjacent housing end wall. In addition, this annular channel member is easy to install and replace.

A further object of the invention is to provide additional seal means in combination with the fluid-conveying annular channel member and disposed between the rotor end face and the adjacent housing end wall to prevent leakage of the oil or similar fluid coolant radially outward toward the working chambers.

A further feature of the invention is the provision of an annular outlet port opening disposed in the inner face of the outer-body end wall and intermittently communicating with each successive recess on the fluid-conveying annular channel.

Figure 2:
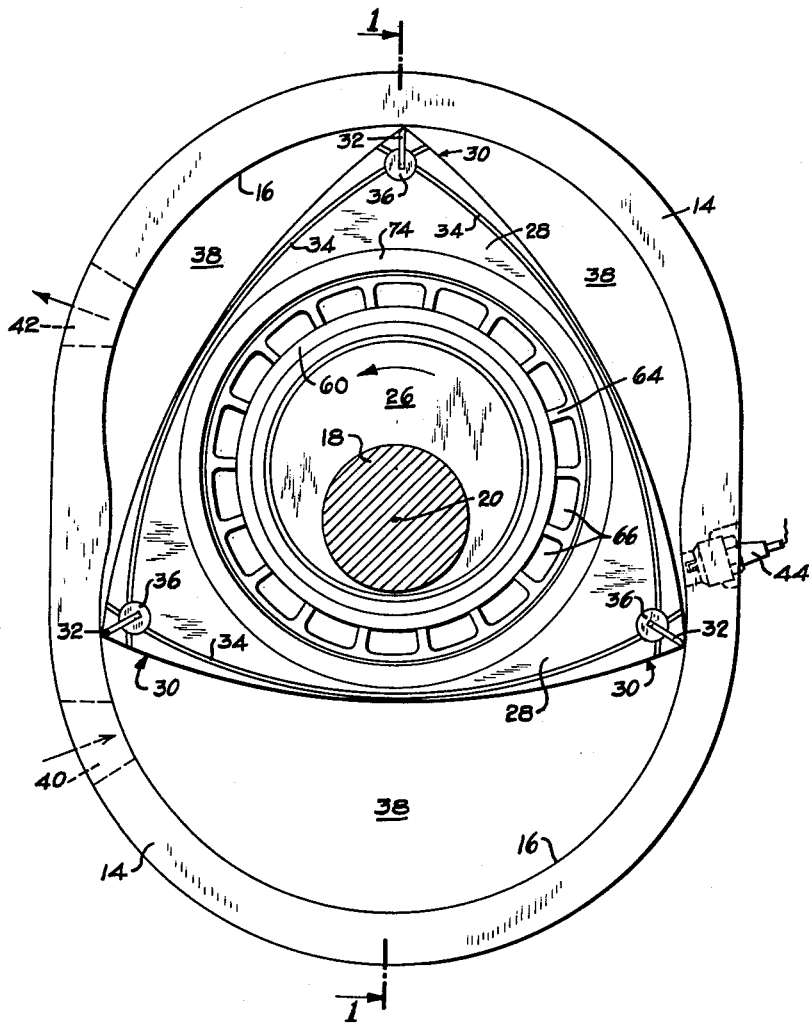
Figure 3:
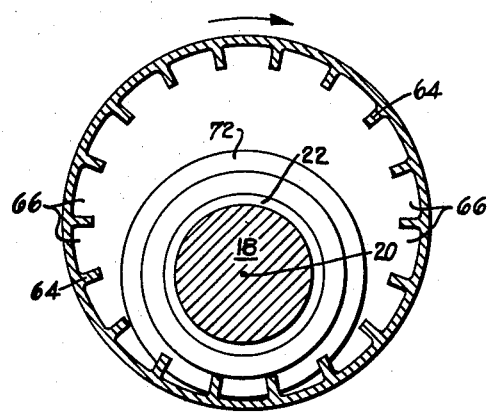
Figure 4:
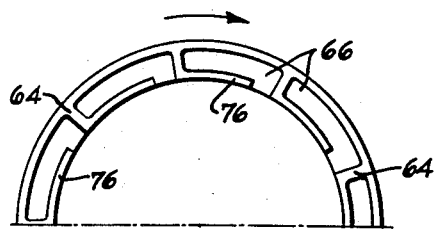

Other objects of the invention will become apparent upon reading the annexed detail description in connection with the drawing in which;

FIGURE 1 is a longitudinal sectional view, taken along line 1—1 of FIGURE 2, and showing a rotary combustion engine embodying this invention, FIGURE 2 is a view, taken on line 2—2 of FIGURE 1, FIGURE 3 is a cross-sectional view, taken on line 3—3 of FIGURE 1, FIGURE 4 is a partial cross-sectional view, similar to FIGURE 3 and showing a modified detail.

Referring to the drawings, the housing or outer body of a rotary combustion engine comprises spaced end walls 10 and 12 and a peripheral wall 14 disposed between and interconnecting said end walls to form a cavity therebetween. The inner surface 16 of the peripheral wall 14 preferably has a multi-lobed profile in cross-section which is basically an epitrochoid.

A shaft 18, having an axis 20, which is co-axial with the axis of the outer-body and along which the end walls 10 and 12 are spaced, extends through the outer body and is journaled in bearings 22 carried by the end walls 10 and 12. The shaft 18 has an eccentric portion 26 on which an inner body or rotor 28 is journaled. The rotor 28 is disposed inside and eccentric to the housing cavity and has a plurality of circumferentially-spaced apex portions 30 about its outer periphery. Each of said apex portions 30 has radially-movable apex seal means 32 received within a single outwardly-facing groove extending in a direction parallel to the rotor axis from one end face to the other of the rotor 28 and urged radially outward by spring means into sealing engagement with the peripheral wall inner surface.

The inner body 28 also has end faces having end-face seal means 34 and intermediate seal elements 36 disposed in sealing engagement with the end walls 10 and 12 which together with the apex seals 32 form a plurality of working chambers 38 which vary in volume upon rotation of the inner body 28 relative to the stationary outer body.

The outer body has intake port means 40 for supply of an intake charge to the working chambers 38 and has exhaust port means 42 for discharge of exhaust gases from the engine. If needed, a suitable spark plug 44 may be provided to ignite the intake charge.

In order to maintain the relative motion of the inner body 28 relative to the stationary outer-body an internal gear 46 is, as illustrated, secured to the inner body co-axially with the inner-body axis and is disposed in mesh with a fixed external gear 48 secured to the outer body as illustrated, said fixed gear being co-axial with the shaft.

For cooling the inner body 28, said body is provided with a hollow interior 56 through which a cooling fluid flows. The cooling fluid, such as lubricating oil is supplied by a pump (not shown) through passage means 50 in the end wall 10.

The end wall 10 and inner body 28 are separated by a space 52 which is adjacent to the inner-body internal gear 46 and the outer-body fixed external gear 48 and communicates with the end-wall inlet passage means 50 through which the cooling fluid passes to the inner body 28. The inner body 28 has disposed on its end face adjacent to the end wall 10 a fluid seal which is disposed radially outward of the gear space 52 but radially inward of the end-face seals 34 for preventing leakage of the cooling fluid from the gear space 52 into the working chambers 38.

The inner body 28 contains an inflow fluid passage or passages 54 connecting the gear space 52 adjoining an inner-body end face with the inner-body hollow portion 56 for supplying the hollow portion 56 with cooling fluid. The inner body also has an outflow fluid passage 60, which may be annular, communicating with the inner-body hollow portion 56 for outflow of the cooling fluid from the opposite end face of the inner body 28.

According to the invention, the inner body 28 and end wall 12 on the outflow side of the inner body 28 form a chamber 62 therebetween, preferably in a recessed portion of the end face of the inner body 28, receiving an open annular channel member or ring 64, which is co-axial with the inner body 28 and disposed alongside the inner body 28. Hence, the open channel member 64 rotates with the inner body 28 about the axis of the shaft 18 relatively to the stationary outer body. The annular channel member 64 is carried by the inner body 28, radially outwardly of the outflow passage 60 and said annular channel member 64 has an L-shaped cross-section and is disposed to open in a radially inward direction and in an axial outward direction toward the end wall 12. Thus, the cooling fluid outflow empties from the inner body through its outflow passage 60 and collects within the rotating annular channel membre 64 at its perimeter due to the centrifugal force on the cooling fluid.

The annular channel member 64 has a plurality of circumferentially-spaced substantially radial webs which divide the channel of the member 64 into a plurality of circumferentially-spaced cup-like recesses 66 opening radially inwardly and also axially outwardly.

One leg of the L-shaped annular channel member 64 faces axially outward and bears elastically against the flat inner surface of its adjacent outer-body end wall 12. For this purpose, the annular channel member 64 is urged axially outward against the adjacent end wall 12 by a spring-like, resilient seal ring 68, preferably a rubber ring, disposed between the other leg of the L-shaped annular member 64 and the inner body 28 at the bottom of the inner-body recess within which the channel member 64 is disposed. Hence, the axially outward sides of the recesses 66 are closed by the adjacent end wall 12 and the annular channel member 64 itself acts as a fluid seal preventing leakage radially outwardly toward the working chambers 38 between the inner body 28 and the end wall 12.

The end wall 12 is provided with an annular groove 72 on its inner face communicating with one or more outlet passages 70. The annular groove 72 is co-axial with the outer body axis 20 and has a radius which is substantially equal to the minimum radial distance of the recess 66 from the outer body axis 20 but is less than the minimum radial distance from said axis 20 to the edge of the annular channel member 64 engaging the end wall 12. Hence, the entire annular groove 72 is disposed radially inside the path traveled by the sealing edge of the annular channel member 64.

The cooling fluid enters the space 52 adjacent to the indexing gears 46 and 48 through an inlet passage means 50 in the end wall 10 preferably from an exterior pump (not shown), and the fluid passes from the gear space 52 to the inner-body hollow interior 56 through an inflow fluid conduit 54.

The cooling fluid emerging from the outflow fluid passage 60 from the inner-body hollow interior 56 into chamber 62 is forced radially outwardly by centrifugal force into the individual recesses 66 in the rotating annular channel member 64. The recesses 66 of the annular channel member 64 sequentially move into communication with the annular outlet channel 72 as the rotor 28 with its channel member 64 rotates about the engine axis 20. As each recess 66 communicates with the outlet channel 72 the centrifugal pressure on the liquid within the recess forces it out through said outlet channel. From the outlet channel 72 the fluid discharges through outlet passages 70 from which, after passing through a suitable filter and cooler (not shown), it is returned back to the inlet supply passage 50.

In the absence of the individual recesses 66, the cooling fluid would always remain collected at the region of the channel member at the greatest radial distance from the axis 20 because the centrifugal force on the fluid is a maximum in this region. However, the outlet passage in the end wall could not be placed at this large radial distance from the axis 20 because it interferes with engine operation.

As already stated, because the annular channel member 64 is elastically urged against the end wal 12 it also functions as a seal. However, it is difficult to ensure continuous contact of the channel member 64 around its entire periphery with the end wall 12. Because of this fact, the engine preferably is not made with the degree of precision required to ensure a substantially perfect seal between the channel member 64 and the end wall 12 whereby there is a small leakage of oil radially outwardly between said member 64 and the end wall 12. This leakage is sealed by an annular seal means 74 disposed radially outwardly of the channel member 64. The latter seal 74 is carried by the inner body 28 and sealingly engages the end wall 12.

As an alternate type of outlet port opening, in place of an annular outlet groove 72 as illustrated in the drawings, it is possible to provide a series of outlet drain holes, disposed in the flat inner surface of the end wall 12, substantially at the radius of the groove from the axis 20.

As another feature, each recess 66 in the annual channel member may also have a web member 76 which extends over and partly encloses the recess 66 on the radially-inward open side of each recess 66 as illustrated in FIGURE 4. Each web member 76 may be an integral part of the annular channel member, or each web member 76 may be a separate cover plate connected to the annular channel member 64. In this way, cooling fluid is better retained in the recesses as the annular channel member 64 rotates eccentrically in a planetary path, and as the cooling fluid in each recess 66 is subjected to a centrifugal force which is not always acting in a radial outward direction.

As a further modification of the invention the inner body 28 may be urged axially toward the end wall 12. In such an engine configuration the annular channel member 64 may be made integral with the inner body 28 so that said channel member is pressed into sealing engagement with the end wall 12.

The invention including its various improvements minimizes the volume of cooling fluid required for cooling the rotor and is suited to assembly in single and multiple engine arrangements. The annular channel member 64 is easy to install and replace; and is a fluid seal to seal the cooling fluid away from the working chambers.

While I have described my invention in detail in its present preferred embodiment it will be obvious to those skilled in the art after understanding my invention that various changes and modifications may be made therein without departing from the spirit and scope thereof. I intend by the appended claims to cover all such modifications.

What is claimed is:

1. A rotary mechanism comprising an outer body having spaced end walls and a peripheral wall forming a cavity therebetween having an axis along which the end walls are spaced; a shaft co-axial with said cavity and having an eccentric portion; an inner body journaled on said eccentric portion and disposed within said cavity such that said inner body has a planetary motion about said axis, said inner body being hollow and having an inflow passage and an outflow passage for flow of liquid coolant therethrough with said outflow passage opening through an end face of the inner body and an annular channel member co-axially carried by the inner body at its said end face and disposed radially outwardly of said inner body outflow passage, said annular channel member having a portion sealingly engaging the adjacent end wall and having a plurality of circumferentially-spaced recesses which open radially inwardly and axially outwardly toward said end wall, said end wall having an outlet passage disposed so as to be in successive communication with said recesses during operation of the mechanism.

2. A rotary mechanism as claimed in claim 1 and in which said annular channel member has an L-shaped cross-section with one leg facing axially outwardly and with its other leg facing radially inwardly, and resilient means disposed between said inner body and said annular channel member and urging said annular channel member axially outwardly into contact with said end wall.

3. A rotary mechanism as claimed in claim 1 and in which said end wall outlet passage has a portion comprising an annular groove disposed in the inner surface of the outer-body end wall co-axial with the outer-body axis.

4. A rotary mechanism as claimed in claim 1 and in which said annular channel member has web members extending over and partly enclosing the radially-inward opening in each said recess.

5. A rotary mechanism as claimed in claim 1 and in which said inner body has an annular seal means disposed on its end face radially outwardly and encircling said annular channel member and in sealing engagement with its adjacent outer-body end wall.

6. A rotary mechanism as claimed in claim 1 and including an annular resilient seal means disposed between and in sealing engagement with the annular channel member and the inner body and urging the annular channel member axially outwardly into engagement with the adjacent outer-body end wall.

References Cited in the file of this patent

UNITED STATES PATENTS

| | | |
|---|---|---|
| 3,042,009 | Froede et al. | July 3, 1962 |
| 3,098,605 | Bentele et al. | July 23, 1963 |